(12) United States Patent
Yamashita

(10) Patent No.: US 11,286,212 B2
(45) Date of Patent: Mar. 29, 2022

(54) FOLIAR FERTILIZER COMPOSITIONS AND METHODS FOR USING SAME

(71) Applicant: Thomas T. Yamashita, Turlock, CA (US)

(72) Inventor: Thomas T. Yamashita, Turlock, CA (US)

( * ) Notice: Subject to any disclaimer, the term of this patent is extended or adjusted under 35 U.S.C. 154(b) by 25 days.

(21) Appl. No.: 16/534,726

(22) Filed: Aug. 7, 2019

(65) Prior Publication Data

US 2020/0048156 A1 Feb. 13, 2020

Related U.S. Application Data

(60) Provisional application No. 62/716,847, filed on Aug. 9, 2018.

(51) Int. Cl.
| | | |
|---|---|---|
| *C05F 11/00* | (2006.01) | |
| *C05F 11/10* | (2006.01) | |
| *A01N 65/03* | (2009.01) | |
| *A01N 63/00* | (2020.01) | |

(52) U.S. Cl.
CPC .............. *C05F 11/00* (2013.01); *A01N 63/00* (2013.01); *A01N 65/03* (2013.01); *C05F 11/10* (2013.01)

(58) Field of Classification Search
None
See application file for complete search history.

(56) References Cited

U.S. PATENT DOCUMENTS

| | | | |
|---|---|---|---|
| 4,473,648 A | 9/1984 | Tang | |
| 4,652,294 A | 3/1987 | Arnold | |
| 4,952,229 A | 8/1990 | Muir | |
| 5,439,873 A * | 8/1995 | Kinnersley | C05F 11/00 504/158 |
| 5,549,729 A | 8/1996 | Yamashita | |
| 5,582,627 A | 12/1996 | Yamashita | |
| 5,696,094 A | 12/1997 | Yamashita | |
| 6,165,245 A | 12/2000 | Yamashita | |
| 6,309,440 B1 * | 10/2001 | Yamashita | C05F 11/00 71/27 |
| 6,475,258 B1 | 11/2002 | Yamashita | |
| 2006/0084573 A1 * | 4/2006 | Grech | C05B 17/00 504/101 |
| 2006/0142158 A1 * | 6/2006 | Nonomura | A01N 59/06 504/101 |
| 2009/0078014 A1 * | 3/2009 | Yamashita | C05G 5/23 71/11 |
| 2015/0239788 A1 * | 8/2015 | Yamashita | C05B 17/00 504/101 |
| 2017/0121234 A1 * | 5/2017 | Arioli | C05G 5/23 |
| 2017/0334794 A1 * | 11/2017 | Nori | C05F 11/00 |
| 2018/0346389 A1 * | 12/2018 | Castellani | C05D 9/02 |

FOREIGN PATENT DOCUMENTS

EP 0161395 A2 11/1985

* cited by examiner

*Primary Examiner* — Wayne A Langel
(74) *Attorney, Agent, or Firm* — Khin K. Chin; Bret E. Field; Bozicevic, Field & Francis LLP

(57) ABSTRACT

Aspects of the present disclosure include foliar fertilizer compositions. Compositions according to certain embodiments include a source of a plant growth regulator, an ionophore and water. Methods for applying the compositions to the foliage of plants to enhance plant growth (e.g., enhance heat tolerance and cold stress, increase photosynthetic activity) and kits having one or more fertilizer composition for applying to the foliage of a plant are also described.

19 Claims, No Drawings

FOLIAR FERTILIZER COMPOSITIONS AND METHODS FOR USING SAME

CROSS-REFERENCE TO RELATED APPLICATION

Pursuant to 35 U.S.C. § 119 (e), this application claims priority to the filing date of the U.S. Provisional Patent Application Ser. No. 62/716,847 filed Aug. 9, 2018; the disclosure of which application is herein incorporated by reference.

INTRODUCTION

Fertilizers are materials that are conventionally used to supply elements needed for plant nutrition and can be in the form of solids, semi-solids, liquids, gases, slurry etc. The use of fertilizers is often critical to commercial agriculture as fertilizers are used to correct natural deficiencies and/or replace components of soil. Commercially, fertilizers have been used to correct natural deficiencies, replace missing components or to supplement essential nutrients present in low abundance. It is estimated that between 30% and 50% of all agricultural crop yield is attributed to benefits provided by fertilizers. In spite of the number of different fertilizers that have been developed, there is a continued need to develop new compositions.

A foliar fertilizer is directly applied to the surface of the plant and nutrients are absorbed through different components of the plant that are typically found above the ground, such as the leaves, stems, flowers, fruit, etc. as well as through bark (e.g., tree trunk bark). The absorption of the components of the fertilizer often takes place through plant stomata, plant cuticle as well as through plant epidermis.

SUMMARY

Aspects of the present disclosure include foliar fertilizer compositions. Compositions according to certain embodiments include a source of a plant growth regulator, an ionophore and water. Methods for applying the compositions to the foliage of plants to enhance plant growth (e.g., enhance heat and cold stress tolerance, increase photosynthetic activity) and kits having one or more fertilizer composition for applying to the foliage of a plant are also described.

In embodiments of the present disclosure, the subject compositions are formulated to enhance plant growth with application to foliage, such as by increasing photosynthetic activity, enhancing heat and cold stress tolerance and increasing resistance to damage by diseases caused by parasitic microbes, fungi and/or nematodes. In embodiments, foliar fertilizer compositions are provided and include a source of a plant growth regulator, an ionophore and water. In some instances, the source of plant growth regulator is a seaweed extract, such as an extract from a *Durvillea* seaweed or an *Ascophyllum* seaweed. In some instances, the seaweed extract is an extract from one or more of *Durvillea potatorum* or *Ascophyllum nodosum*. The source of plant growth regulator includes, in certain embodiments, a cytokinin, an auxin, a gibberellin (e.g., gibberellic acid), a jasmonate, a salicylic acid, a strigolactone, an abscisic acid, a brassinosteriod or a combination thereof.

In embodiments, compositions also include an ionophore. The ionophore may be an antibiotic, an amino butyric acid or a combination thereof. In some instances, the ionophore is an antibiotic such as valinomycin. In other embodiments, the ionophore is an amino butyric acid such as 4-gamma amino butyric acid (4-GABA). In certain embodiments, the subject compositions include an ionophore component having a combination of an antibiotic and an amino butyric acid, such as a combination of valinomycin and 4-gamma amino butyric acid. In some embodiments, the subject compositions include a coenzyme. In certain instances, the coenzyme is a vitamin B complex such as vitamin $B_1$ (thiamine); vitamin $B_1$ disulfide (thiamine disulfide); vitamin $B_1$ propyl disulfide (thiamine propyl disulfide; prosultiamine); vitamin $B_2$ (riboflavin); vitamin $B_2$ phosphate (riboflavin monophosphate); vitamin $B_3$ (nicotinamide, niacin, nicotinic acid); vitamin $B_4$ (adenine); vitamin $B_5$ (pantothenic acid); vitamin $B_6$ hydrochloride (pyridoxine hydrochloride); vitamin $B_{12}$ (cyanocobalamin); vitamin $B_{12r}$ (vitamin $B_{12}$-Co(II)); vitamin $B_{12}$ coenzyme (cobamamide); vitamin $B_{12a}$; vitamin $B_{12b}$; vitamin $B_{12c}$; vitamin $B_{12d}$; vitamin $B_{12p}$; vitamin $B_{12s}$; vitamin $B_{13}$ (orotic acid); vitamin $B_x$ (p-aminobenzoic acid, PABA); and vitamin $B_c$ (folic acid) or a combination thereof. In some embodiments, the coenzyme is folic acid. In other embodiments, the coenzyme is pyridoxine. In yet other embodiments, the foliar composition includes a coenzyme component having folic acid and pyridoxine.

Compositions may also include a carbon skeleton energy component, such as a source of a carbohydrate (e.g., a monosaccharide, a disaccharide of combination thereof). In some embodiments, the carbon skeleton energy component is one or more of sugar (e.g., granulated table sugar, powdered sugar), molasses, whey, corn steep liquor, grape syrup, maple syrup and corn syrup and combinations thereof. In certain embodiments, the carbon skeleton energy component includes sucrose.

In some embodiments, the compositions also include a complexing agent. The complexing agent may be an agent that aids in the solubilization of components of the composition and may also serve to tie up ions (e.g., iron or other ions) and prevent formation of precipitates. Complexing agents, in certain instances, include humic acid, fulvic acid, a lignosulfonate, citric acid and combinations thereof. In some embodiments, the complexing agent is a chelating agent such as such as ethylenediamine tetraacetatic acid (EDTA), diethylene triamine pentaacetic acid (DTPA), nitrolotriacetic acid (NTA), ethylenediaminediacetate (EDDA), ethylenediaminedi(o-hydroxyphenylacetic) acid (EDDHA), hydroxyethylethylene-diaminetriacetic acid (HEDTA), cyclohexane diamine tetraacetic acid (CDTA). The subject compositions may also include a source of potassium, such as potassium acetate, potassium nitrate, potassium hydroxide, potassium sulfate and potassium sorbate and a source of calcium, such as calcium nitrate, calcium acetate, calcium gluconate and calcium sulfate. In some embodiments, compositions include a preservative such as one or more of propionic acid, acetic acid, potassium sorbate, tartaric acid and malic acid.

Aspects of the present disclosure also include methods for using the subject compositions, e.g., to fertilize one or more plants. In some embodiments, methods include administering the composition to the foliage of the plants by a hand-held applicator or by ground-level mechanical machinery. In other embodiments, methods include administering the composition to the foliage of the plants by aircraft (e.g., helicopter, airplane).

Aspects of the present disclosure also include methods for determining that subject plants are in need of treatment with the foliar fertilizer composition. In some instances, the subject plants may be determined to be in need of treatment with the foliar fertilizer composition where the plants have been subjected to increased heat or cold stress and has shown a decrease in crop production as compared to a suitable control. In other instances, the subject plants may be determined to be in need of treatment with the foliar fertilizer composition where the plants have been subjected to increased heat or cold stress and a crop production per area which is below a predetermined threshold. In yet other instances, the subject plants may be determined to be in need of treatment with the foliar fertilizer composition by evaluating observable characteristics of the target plants subjected to increased heat or cold stress.

DETAILED DESCRIPTION

Aspects of the present disclosure include foliar fertilizer compositions. Compositions according to certain embodiments include a source of a plant growth regulator, an ionophore and water. Methods for applying the compositions to the foliage of plants to enhance plant growth (e.g., enhance heat tolerance and cold stress, increase photosynthetic activity) and kits having one or more fertilizer composition for applying to the foliage of a plant are also described.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As reviewed above, the present disclosure provides foliar fertilizer compositions. In further describing embodiments of the invention, compositions having a plant growth regulator, an ionophore and water are first reviewed in greater detail. Next, methods for using the subject compositions to fertilize one or more plants and methods for evaluating the effect of the subject composition on the plant contacted with the subject compositions are described. Kits including one or more of the subject compositions are also described.

Foliar Fertilizer Compositions

As summarized above, the subject invention provides foliar fertilizer compositions. The term "fertilizing" is used herein in its conventional sense to refer to providing or supplementing essential nutrients to the plants through the foliage. As used herein, the term "foliage" refers to the components of plants that are typically found above ground (i.e., above the soil line) and include the stem, leaves, flowers, fruit and bark of the plant. In some embodiments, the subject foliar fertilizer compositions are delivered through the leaves of plants, such as the stomata or epidermis of the leaves of the contacted plants. Fertilizing may be passive, such as where the subject compositions simply provide a source of essential nutrients. Alternatively, fertilizing may be active, such as where the subject composition initiates, catalyzes or otherwise facilitates uptake of the essential nutrients through the foliage of the plants.

In some embodiments, fertilizing may be realized by an enhancement of one or more growth properties of the plant. In certain instances, the subject foliar fertilizer compositions provide for an enhancement in the heat tolerance by the plants, such as where plants contacted with the subject compositions exhibit little to no change in growth or other desirable parameter (e.g., amount of harvestable crop as described below) when subjected to an increase in temperature of 5° C. or more, such as 6° C. or more, such as 7° C. or more, such as 8° C. or more, such as 9° C. or more, such as 10° C. or more, such as 15° C. or more, such as 20° C. or more, such as 25° C. or more and including 30° C. or more. For example, plants contacted with the subject composition exhibit a change in growth or other desirable parameter by 5% or less when subjected to the increased temperature, such as 4% or less, such as 3% or less, such as 2% or less, such as 1% or less, such as 0.5% or less, such as 0.1% or less, such as 0.01% or less, such as 0.001% or less and including 0.0001% or less when subjected to the increased temperature.

In other embodiments, the subject foliar fertilizer compositions provide for an enhancement in the tolerance to cold stress by the plants, such as where the plants contacted with the subject compositions exhibit little to no change in growth or other desirable parameter when subjected to a decrease in temperature of 5° C. or more, such as 6° C. or more, such as 7° C. or more, such as 8° C. or more, such as 9° C. or more, such as 10° C. or more, such as 15° C. or more, such as 20° C. or more, such as 25° C. or more and including 30° C. or more. For example, plants contacted with the subject composition exhibit a change in growth or other desirable parameter by 5% or less when subjected to the decreased temperature, such as 4% or less, such as 3% or less, such as 2% or less, such as 1% or less, such as 0.5% or less, such as 0.1% or less, such as 0.01% or less, such as 0.001% or less and including 0.0001% or less when subjected to the decreased temperature.

In yet other embodiments, the subject foliar fertilizer compositions provide for an increase in photosynthetic activity of plants, such as where photosynthetic activity is increased by 10% or more, such as by 15% or more, such as by 25% or more, such as by 50% or more, such as by 75% or more and including by 90% or more. In certain instances, contacting the subject fertilizer composition with the foliage of the plants is sufficient to increase the photosynthetic activity of the plants by 1.5-fold or more, such as by 2-fold or more, such as by 3-fold or more, such as by 4-fold or more, such as by 5-fold or more and including by 10-fold or more.

In certain embodiments, fertilizing may be realized by an enhancement in the overall health of plants contacted with the subject composition, where in some instances the desired enhancement ultimately results in greater amount of harvestable crop produced. For example, in some embodiments enhanced overall health of plants contacted with the subject foliar fertilizer compositions includes an increased amount of harvested crop by 10% or more, such as 25% or more, such as 50% or more, such as 75% or more and including increasing the amount of harvested crop by 100% or more. For example, the increased amount of harvested crop may range from 10% to 100%, such as from 25% to 75% and including from 30% to 60%. In other instances, compositions of interest may increase harvested crop production by 1.5-fold or greater, such as 2-fold or greater, such as 2.5-fold or greater, such as 3-fold or greater, such as 5-fold or greater and including increasing harvested crop by 10-fold or greater. For example, the increased harvested crop may range from 1.5-fold to 25-fold, such as from 2-fold to 20-fold, such as from 3-fold to 18-fold and including from 5-fold to 15-fold. The above values are provided in comparison to a suitable control.

In certain instances, where the harvested crops are fruits or nuts, the subject foliage fertilizer compositions may increase the amount of crop produced by 250 pounds per acre or more, such as 500 pounds per acre or more, such as 1000 pounds per acre or more, such as 1500 pounds per acre or more and including by 2000 pounds per acre or more, e.g., as compared to suitable control or reference (such where the subject compositions are not employed but all other parameters are the same). For example, the harvested crop may be increased from 250 pounds to 5000 pounds, such as from 500 pounds to 4500 pounds, such as from 750 pounds to 4000 pounds and including from 1000 pounds to 3000 pounds. The above values are provided in comparison to a suitable control.

In other embodiments, enhanced overall health of the subject plants by contacting the fertilizer composition with the foliage of the plants is realized by an improvement in the quality of harvested crops (e.g., color, taste, duration of shelf life, etc.) as compared to harvested crops from plants not contacted with the subject foliar fertilizer compositions.

In some embodiments, the subject compositions are synergistically effective such that the combination of components in the foliar fertilizer composition produces an effect (i.e., enhances growth, photosynthetic activity, increased heat and cold stress tolerance) that is greater than would be achieved by the sum of each individual component. For example, in some instances, the subject compositions produce an effect that is greater than would be achieved by the sum of individually applying a composition having a plant growth regulator and a composition having an ionophore. In certain instances, the subject compositions include a source of plant growth regulator, a coenzyme, a carbon skeleton energy compound, a complexing agent, an ionophore, a source of potassium and a source of calcium and the composition produces an effect that is greater than would be achieved by the sum of a composition having a plant growth regulator and a composition having a coenzyme, a carbon skeleton energy compound, a complexing agent, an ionophore, a source of potassium and a source of calcium. In yet other instances, the subject compositions produce an effect that is greater than would be achieved by the sum of individually applying a composition having a plant growth regulator, a composition having a coenzyme, a composition having a carbon skeleton energy compound, a composition having a complexing agent, a composition having an ionophore, a composition having a source of potassium and a composition having a source of calcium.

In embodiments of the present disclosure, a composition having a plant growth regulator, an ionophore and water (such as a composition having water, a plant growth regulator, a coenzyme, a carbon skeleton energy compound, a complexing agent, an ionophore, a source of potassium and a source of calcium) produces an effect that is 1% greater or more than would be achieved by the sum of the components of the composition, individually, such as 5% greater or more, such as 10% greater or more, such as 20% greater or more, such as 30% greater or more, such as 40% greater or more, such as 50% greater or more, such as 60% greater or more, such as 70% greater or more, such as 80% greater or more, such as 90% greater and including 100% greater or more. In certain instances, synergistic combinations of the present invention produce an effect which is 2-fold or greater, such as 5-fold or greater, such as 10-fold or greater and including 25-fold or greater than would be achieved by the sum of each component of the composition individually.

The synergistic effect may be realized, in certain embodiments, by increased plant growth as compared plant growth achieved by the sum of each component, individually. As discussed above, the synergistic effect of the subject composition may be realized by greater production of some desirable parameter, such as for example the amount of harvestable crop produced. In some embodiments, the synergistic effect of the composition is exhibited through increased photosynthetic activity as compared to the sum of each component, individually. In other embodiments, the synergistic effect of the composition is exhibited through increased heat tolerance by the applied plants as compared to the sum of each component, individually. In yet other embodiments, the synergistic effect of the composition is exhibited through increased cold stress tolerance by the applied plants as compared to the sum of each component, individually.

In some embodiments, the subject compositions are aqueous compositions, and accordingly include amount of water. The amount of water present in the composition may vary depending on whether the composition is a concentrated or dilute composition. Compositions of interest may include in certain instances from about 5% to about 25% water, from about 25% to about 50% water, from about 50% to about 75% water and including from about 75% to about 90% water. As such, where compositions of interest are aqueous compositions, the amount of water may be 90% w/w or less, such as 80% w/w or less, such as 70% w/w or less, such as about 60% w/w or less, such as about 50% w/w or less, such as about 40% w/w or less, such as 30% w/w or less and including 20% w/w or less.

As summarized above, compositions of interest are foliar fertilizer compositions for applying to the foliage of one or more plants. The subject compositions include a plant growth regulator and an ionophore. The subject compositions may also include one or more of a coenzyme, a carbon skeleton energy compound, a complexing agent, an ionophore, a source of potassium and a source of calcium. In certain embodiments, compositions may include macronutrients, micronutrients as well as exotic micronutrients. The compositions are not naturally occurring, i.e., they are synthetic or man-made. Each of the different components of the compositions is now reviewed in greater detail. The amount of each component may vary in the subject compositions depending on the type of plants being applied to, geographical area and environmental conditions (e.g., wind conditions, precipitation, etc.) or application method employed. As such, the amounts of each component may be varied as desired, such as by increasing or reducing the amount or ratio of a particular component in the composition prior to application.

Source of Plant Growth Regulator

In embodiments of the present disclosure, compositions of interest include a source of a plant growth regulator. The term "plant growth regulator" is used herein in its conventional sense to refer to compounds that promote and influence growth factors of plants, such as phytohormones that promote gene expression, transcription levels, cellular division and photosynthetic activity. Plant growth regulators of interest also control embryogenesis, growth rate and size, pathogen defense, stress tolerance and reproductive development. Depending on the type of plant being fertilized, the source of plant growth regulator may include a cytokinin, an auxin, a gibberellin, a jasmonate, a salicylic acid, a strigolactone, an abscisic acid, a brassinosteriod or a combination thereof. In some embodiments, the source of plant growth regulator includes a cytokinin. In other embodiments, the source of plant growth regulator includes an auxin. In still other embodiments, the source of plant growth regulator includes a gibberellin such as gibberellic acid.

In some embodiments, the source of the plant growth regulator is a seaweed extract. The seaweed extract includes an amount of one or more of the plant growth regulator and may be from a seaweed such as a *Durvillea* seaweed or an *Ascophyllum* seaweed. In certain embodiments, the source of the plant growth regulator is an extract from seaweed from *Durvillea potatorum, Ascophyllum nodosum, Ecklonia maxima, Fucus* spp., *Laminaria* spp., *Sargassum* spp., *Tubinaria* spp. or a combination thereof.

One or more of the aforementioned seaweed extracts may be used, as desired, such as two or more, such as three or more, such as four or more, such as five or more and including seven or more. Where the source of plant growth regulator include two or more different seaweed extracts, each type of seaweed extract may be from 1% or more by weight of the source of plant growth regulator, such as 5% or more by weight, such as 10% or more by weight, such as 15% or more by weight, such as 20% or more by weight and including 25% or more by weight. For example, where the source of plant growth regulator includes two or more different seaweed extracts, each seaweed extract may range from 1% by weight to 99% by weight, such as from 5% by weight to 95% by weight, such as from 10% by weight to 90% by weight, such as from 15% by weight to 85% by weight, such as from 20% by weight to 80% by weight and including from 25% by weight to 75% by weight.

The seaweed extract may be dry or wet, as desired. By "dry" is meant that the seaweed tissue in the seaweed extract is processed (e.g., under heat or ambient conditions) to remove water. Accordingly, in these embodiments the seaweed tissue in the seaweed extract will include 1% w/w water or less, such as 0.5% w/w water or less, such as 0.25% w/w water or less, such as 0.1% w/w water or less, such as 0.05% w/w water or less, such as 0.01% w/w water or less and including 0.001% w/w water or less. By "wet" is meant that the seaweed tissue is used in its natural state where water naturally present in the seaweed tissue is not removed prior to employing in the subject compositions.

The amount of the source of plant growth regulator (e.g., seaweed extract) in the subject compositions may vary. In some embodiments, the weight percent of the source of plant growth regulator is from 0.1% w/w to 30% w/w, such as from 0.5% w/w to 25% w/w, such as from 1% w/w to 20% w/w, such as from 2% w/w to 15% w/w and including 5% w/w to 10% w/w. Where the subject foliar fertilizer composition is aqueous, the source of plant growth regulator may be present in the aqueous composition from 0.1% w/v to 30% w/v, such as from 0.5% w/v to 25% w/v, such as from 1% w/v to 20% w/v, such as from 2% w/v to 15% w/v and including from 5% w/v to 10% w/v.

Ionophore Component

Compositions of interest also include an ionophore. The term "ionophore" is used in its conventional sense to refer to the class of organic compounds that are capable of transporting ions across lipid barriers in a plant cell. Ionophores of interest include, but are not limited to antibiotics, such as Gramicidin A and Valinomycin, and Amino Butyric Acids (ABA), such as D-alpha ABA, DL-alpha ABA, L-alpha ABA, DL-Beta ABA, Gama-ABA (GABA) (e.g., 4-GABA), and the like.

The total amount of ionophore in the subject compositions may range from about 1 ppm to 500 ppm w/w, such as 5 ppm to 450 ppm w/w, such as 10 ppm to 400 ppm w/w, such as 15 ppm to 350 ppm w/w, such as 25 ppm to 300 ppm and including 50 ppm to 250 ppm w/w, for example 100 ppm w/w.

Water

In certain embodiments, the subject compositions are aqueous compositions, and accordingly include amount of water. The amount of water present in the composition may vary depending on whether the composition is a concentrated or dilute composition. Compositions of interest may include in certain instances from about 5% to about 25% water, from about 25% to about 50% water, from about 50% to about 75% water and including from about 75% to about 90% water. As such, where compositions of interest are aqueous compositions, the amount of water may be 90% w/w or less, such as 80% w/w or less, such as 70% w/w or less, such as about 60% w/w or less, such as about 50% w/w or less, such as about 40% w/w or less, such as 30% w/w or less and including 20% w/w or less.

Vitamins and Coenzyme Component

In some embodiments, compositions of interest include a coenzyme component. Coenzymes of interest include non-protein chemical compounds (e.g., vitamin complex) that enhance enzymatic activity by plants. In some embodiments, the coenzyme is a vitamin B complex, such as for example vitamin $B_1$ (thiamine); vitamin $B_1$ disulfide (thiamine disulfide); vitamin $B_1$ propyl disulfide (thiamine propyl disulfide; prosultiamine); vitamin $B_2$ (riboflavin); vitamin $B_2$ phosphate (riboflavin monophosphate); vitamin $B_3$ (nicotinamide, niacin, nicotinic acid); vitamin $B_4$ (adenine); vitamin $B_5$ (pantothenic acid); vitamin $B_6$ hydrochloride (pyridoxine hydrochloride); vitamin $B_{12}$ (cyanocobalamin); vitamin $B_{12r}$ (vitamin $B_{12}$-Co(II)); vitamin $B_{12}$ coenzyme (cobamamide); vitamin $B_{12a}$; vitamin $B_{12b}$; vitamin $B_{12c}$; vitamin $B_{12d}$; vitamin $B_{12p}$; vitamin $B_{12s}$; vitamin $B_{13}$ (orotic acid); vitamin $B_x$ (p-aminobenzoic acid, PABA); and vitamin $B_c$ (folic acid) or a combination thereof. The subject composition may include one or a plurality of different types of coenzymes (e.g., vitamin B complexes). Accordingly, the number of different types of coenzymes present in a composition may range from about 1 to about 20 or more, e.g., from about 3 to about 15, e.g., from about 5 to about 12. In some embodiments, the coenzyme includes one or more of N-[4[[(2-Amino-1,4-dihydro-4-oxo-6-pteridinyl)methyl]amino]benzoyl]-L-glutamic acid, PGA, liver *Lactobacillus casei* factor; vitamin $B_C$; vitamin M, folsäure, cytofol; folacin, foldine, foliamin, foliacet, folipac, folettes, folsan, folvite, inafolic and millafol. In other embodiments, the coenzyme includes one or more of pyridoxine hydrochloride, 5-hydroxy-6-methyl-3,4-pyridinedimethanol hydrochloride; pyridoxol hydrochloride, vitamin $B_6$ hydrochloride, pyridoxinium chloride, adermine, hydrochloride, bonasanit, hexabione hydrochloride, hexabetalin, hexavibex, pyridipea, pyridox, bécilan, benadon, hexermin, campovitron 6, hexabion.

In certain embodiments, the coenzyme is:

Thiamine—pyrophosphate, thiamine monophosphate, thiamine disulfide, thiamine mononitrate, thiamine phosphoric acid ester chloride, thiamine phosphoric acid ester phosphate salt, thiamine 1,5 salt, thiamine triphosphoric acid ester, thiamine triphosphoric acid salt, yeast, yeast extract.

Riboflavin—acetyl phosphate, flavin adenine dinucleotide, flavin adenine mononucleotide, riboflavin phosphate, yeast, yeast extract.

Nicotinic acid—nicotinic acid adenine dinucleotide, nicotinic acid amide, nicotinic acid benzyl ester, nicotinic acid monoethanolamine salt, yeast, yeast extract, nicotinic acid hydrazide, nicotinic acid hydroxamate, nicotinic acid-N-(hydroxymethyl)amide, nicotinic acid methyl ester, nicotinic acid mononucleotide, nicotinic acid nitrile.

Pyridoxine—pyridoxal phosphate, yeast, yeast extract.

Folic acid—yeast, yeast extract, folinic acid.

In some embodiments, compositions of interest include folic acid. In other embodiments, the subject compositions include pyridoxine. In still other embodiments, the composition includes a combination of folic acid and pyridoxine. Where the foliar fertilizer composition includes folic acid and pyridoxine, the weight ratio of folic acid to pyridoxine may vary, such as from 0.1:1 to 10:1, such as from 0.5:1 to 9:1, such as from 1:1 to 8:1, such as from 2:1 to 7:1, such as from 3:1 to 6:1 and including from 4:1 to 5:1. For example, the weight ratio of pyridoxine to folic acid may range from 0.1:1 to 10:1, such as from 0.5:1 to 9:1, such as from 1:1 to 8:1, such as from 2:1 to 7:1, such as from 3:1 to 6:1 and including from 4:1 to 5:1.

The amount of the coenzyme present in the subject compositions may vary and may be from 1 ppm to 100 ppm, such as from 2 ppm to 90 ppm, such as from 3 ppm to 80 ppm, such as from 4 ppm to 70 ppm, such as from 5 ppm to 60 ppm and including from 10 ppm to 50 ppm, such as from 2 ppm to 4 ppm. In certain embodiments, the total amount of coenzyme in the composition may range from about 0.0001% to 5% w/v, such as 0.001% to 4%, including 0.01% to 3.0% w/v.

Where the vitamin and cofactor compositions include two or more compounds, the percent by weight of each vitamin or cofactor compound in compositions of interest may vary, ranging from about 0.0001% to 5% w/v, such as 0.001% to 4%, including 0.01% to 3.0% w/v.

Carbon Skeleton Energy Components

CSE components that find use in the subject compositions are carbon containing substances which provide a readily assimilable source of both carbon and energy. In certain embodiments, the CSE component provides a complex array of various carbon compounds. The carbon skeleton energy component is a $C_2$ to $C_{10}$ containing compound or polymer thereof, e.g., a polymer in which the monomeric units are $C_2$ to $C_{10}$ compounds, such as a polysaccharide, including a $C_4$ to $C_8$ containing compound or polymer. In some embodiments, the carbon skeleton energy compound is a source of a carbohydrate, such as a source of a monosaccharide or a source of a disaccharide or a combination thereof.

CSE components/compounds of interest include: complex organic compositions, such as molasses (e.g. cane, sugar beet, sorghum, etc.), whey, corn steep liquor, grape syrup, maple syrup, corn syrup, etc.; sugars (granulated table sugar, powdered sugar), e.g. sucrose, fructose, glucose, lactose, galactose, dextrose, maltose, raffinose, ribose, ribulose, xylulose, xylose, amylose, arabinose, etc.; sugar phosphates, e.g. fucose-P, galactose-P, glucose-P, lactose-P, maltose-P, mannose-P, ribose-P, ribulose-P, xylose-P, xylulose-P, etc.; sugar alcohols, e.g. adonitol, sorbitol, mannitol, maltitol, ribitol, galactitol, glucitol, etc.; organic acids, e.g. glucuronic acid, alpha ketoglutaric acid, galactonic acid, glucaric acid, gluconic acid, pyruvic acid, polygalacturonic acid, citric acid, succinic acid, malic acid, isocitric acid, folic acid, etc.; nucleotides and bases, e.g. adenosine, adenosine-P, uridine, uridine-P, thymine, thymine-P, cytosine, cytosine-P, guanine, guanine-P, etc.; and amino acids, e.g. glycine, alanine, leucine, isoleucine, asparagine, tyrosine, phenylalanine, serine, cysteine, valine, proline, methionine, glutamine, threonine, lysine, aspartic acid, glutamic acid, arginine, and the like.

In some embodiments, the amount of CSE component in the composition ranges from about 50 ppm to 500,000 ppm, such as from 100 ppm to 400,000 ppm, such as from 250 ppm to 300,000 ppm, such as from 500 ppm to 200,000 ppm, such as from 750 ppm to 100,000 ppm, such as from 1000 ppm to 90,000 ppm, such as from 2500 ppm to 75,000 ppm and including from 2500 ppm to 25,000 ppm. In some instances, the amount of CSE in the composition is from 0.1% to 10% w/v, such as from 0.5% to 9% w/v, such as from 1% to 8% w/v and including from 2% w/v to 7% w/v.

The CSE component may be a single carbon containing compound or a combination of two or more different carbon containing compounds. For example, in some embodiments compositions include two or more carbon containing compounds or polymers, such as where the subject compositions include three or more carbon containing compounds or polymers, such as 4 or more carbon containing compounds or polymers and including 5 or more carbon containing compounds or polymers. Where the CSE component includes two more carbon containing compounds or polymers, the percent by weight of each carbon containing compound in compositions of interest may vary, ranging from 5% to 75% w/w, such as 10% to 60% w/w, such as 15% to 50% w/w, such as 20% to 40% w/w and including 25% to 35% w/w. In certain embodiments, the CSE component is a single carbon containing compound or polymer. In some instances, the carbon skeleton energy compound is sucrose. In other instances, the carbon skeleton energy compound is granulated table sugar.

Complexing Agents

In certain embodiments, the subject compositions may also include one or more complexing agents. A "complexing agent" is used to in its conventional sense to refer to an agent that aids in the solubilization of components of the composition and may also serve to tie up ions (e.g., iron or other ions) and preventing formation of precipitates upon application. A complexing agent may be an agent that is capable of complexing with a metal ion. As such, powder or fine forms of oxidized coal, oxidized bituminous material, ironite, volcanic rock, shale, fossilized peat, moss, kelp or seaweed find use in the subject compositions to provide a source of one or more complexing agents. Other complexing agents of interest include, but are not limited to: humic acid, fulvic acid, citric acid, lignosulfonates, e.g., Ca—, K—, Na—, and ammonium lignosulfonates, amino acids, propionic acid and nucleic acids. In some instances, the secondary complexing agent may be a chelating agent, such as ethylenediaminetetraacetic acid (EDTA), diethylenetriaminepentaacetic acid (DTPA), nitrilotriacetic acid (NTA), ethylenediaminediacetic acid (EDDA), ethylenediamine(o-hydroxyphenyl)acetic acid (EDDHA), (2-hydroxyethyl)ethylene-diaminetriacetic acid (HEDTA), 1,2-cyclohexane diamine tetraacetic acid (CDTA) and the like. Naturally occurring chelating agents may also be employed. By naturally occurring chelating agent is meant that the chelating agent is a chelating agent that occurs in nature, i.e. not an agent that has been first synthesized by human intervention. The naturally occurring chelating agent may be a low molecular weight chelating agent, where by low molecular weight chelating agent is meant that the molecular weight of the chelating agent does not exceed about 200 daltons. In certain embodiments, the molecular weight of the chelating agent is greater than about 100 daltons.

Chelating agents of interest may also include: malic acid, succinic acid, oxaloacetic acid, ketoglutaric acid and citric acid and amino acids derived from citric acid cycle intermediates, such as glycine (75.1 daltons), alanine (89.1 daltons), serine (105.1 daltons), valine (117.2 daltons), threonine (119.1 daltons), cysteine (121.2 daltons), leucine (131.2 daltons), isoleucine (131.2 daltons), aspargine (132.1 daltons), glutamine (146.2 daltons), methionine (149.2 daltons), etc. Embodiments include compositions that may include a source of at least one naturally occurring chelating agent. By source is meant that the compositions may include the chelating agents or an entity or component that produces the chelating agents. In many embodiments, the source of chelating agents is a living or viable microbial source of chelating agents. For example, the microbial source may be a bacterial or fungal culture that produces the requisite chelating agents.

The total amount of complexing agent present in a given composition (whether one or a plurality of complexing agents) depends on a variety of factors such as the particular plant to which the composition is to be administered, the particular complexing agent(s) employed, and the like. In embodiments, the amount of complexing agent in the composition may be from 1 ppm to 500 ppm, such as from 5 ppm to 400 ppm, such as from 10 ppm to 300 ppm, such as from 20 ppm to 200 ppm and including from 25 ppm to 100 ppm. In certain embodiments, the total amount of complexing agent in the composition may range from about 0.0001% to 5% w/v, such as 0.001% to 4%, including 0.01% to 3.0% w/v.

Source of Potassium

Compositions of interest also include a source of potassium. Sources of potassium that find use in the subject compositions are potassium-containing compounds which provide a readily assimilable source of potassium. In some embodiments, the potassium source is an inorganic source of potassium. In certain instances, the source of potassium is chemical potassium source. For example, chemical potassium sources may include, but are not limited to, potassium acetate, potassium nitrate, potassium hydroxide, potassium sulfate and potassium sorbate.

In embodiments, the amount of the potassium source component in the composition ranges from about 1% to 25% w/v, such as 2% to 20% w/v, such as 3% to 15% w/v and including 5% to 10% w/v.

The source of potassium may be a potassium-containing compound or a combination of two or more different potassium containing compounds. For example, in some embodiments compositions include two or more potassium containing compounds, such as where the subject compositions include three or more potassium containing compounds, such as 4 or more potassium containing compounds and including 5 or more potassium containing compounds. Where the source of potassium includes two or more potassium containing compounds, the percent by weight of each potassium containing compound in compositions of interest may vary, ranging from 1% to 25% w/v, such as 2% to 20% w/v, such as 3% to 15% w/v and including 5% to 10% w/v. In certain embodiments, the source of potassium is a single potassium-containing compound, such as potassium nitrate.

Source of Calcium

Compositions of interest also include a source of calcium. Sources of calcium that find use in the subject compositions are calcium-containing compounds which provide a readily assimilable source of calcium. In some embodiments, the calcium source is an inorganic source of calcium. In certain instances, the source of calcium is chemical calcium source. For example, chemical calcium sources might include, but are not limited to, calcium nitrate, calcium acetate, calcium gluconate and calcium sulfate.

In embodiments, the amount of the calcium source component in the composition ranges from about 1% to 25% w/v, such as 2% to 20% w/v, such as 3% to 15% w/v and including 5% to 10% w/v.

The source of calcium may be a calcium-containing compound or a combination of two or more different calcium containing compounds. For example, in some embodiments compositions include two or more calcium containing compounds, such as where the subject compositions include three or more calcium containing compounds, such as 4 or more calcium containing compounds and including 5 or more calcium containing compounds. Where the source of calcium includes two or more calcium containing compounds, the percent by weight of each calcium containing compound in compositions of interest may vary, ranging from 1% to 25% w/v, such as 2% to 20% w/v, such as 3% to 15% w/v and including 5% to 10% w/v. In certain embodiments, the source of calcium is a single calcium containing-compound, such as calcium nitrate.

Preservative Compound

In certain embodiments, foliar fertilizer compositions include a preservative. The term "preservative" is used herein in its conventional sense to refer to a compound that reduces or eliminates degradation, such as by chemical oxidation or by microbial growth. Examples of preservatives of interest in the subject compositions may include acid preservatives such as propionic acid, acetic acid, potassium sorbate, tartaric acid and malic acid.

In embodiments, the amount of the preservative compound in the composition ranges from about 10 ppm to 10,000 ppm, such as from 25 ppm to 9000 ppm, such as from 50 ppm to 8000 ppm, such as from 100 ppm to 7000 ppm and including from 250 ppm to 5000 ppm. In some embodiments, the amount of the preservative compound in the composition ranges from 1% to 25% w/v, such as 2% to 20% w/v, such as 3% to 15% w/v and including 5% to 10% w/v.

Methods for Applying Foliar Fertilizer Composition to the Foliage of Plants

As summarized above, aspects of the invention also include methods for applying one or more of the foliar fertilizer compositions (as described above) to the foliage of plants. As described above, the term "foliage" refers to the components of plants that are typically found above ground (i.e., above the soil) and include the stem, leaves, flowers, fruit and bark of the plant. As such, methods include applying to one or more of the stems, leaves, flowers, fruit or bark of a plant a fertilizer composition.

As described above, the subject methods are sufficient to enhance one or more growth properties of the plant. In certain instances, contacting the foliage of the plants with the foliar fertilizer composition provides for an enhancement in the heat tolerance by the plants, such as where plants contacted with the subject compositions exhibit little to no change in growth or other desirable parameter (e.g., amount of harvestable crop) when subjected to an increase in temperature. In other embodiments, contacting the foliage of the plants with the foliar fertilizer composition provides for an enhancement in the tolerance to cold stress by the plants, such as where the plants contacted with the subject compositions exhibit little to no change in growth or other desirable parameter when subjected to a decrease in temperature. In yet other embodiments, contacting the foliage of the plants with the foliar fertilizer composition provides for an increase in photosynthetic activity of plants.

In certain embodiments, contacting the foliage of the plants with the fertilizer composition provides for an enhancement in the overall health of plants contacted with the subject composition, where in some instances the enhancement is a greater amount of harvestable crop produced. In other embodiments, enhanced overall health of the subject plants by contacting the fertilizer composition with the foliage provides for improvement in the quality of harvested crops (e.g., color, taste, duration of shelf life, etc.) as compared to harvested crops from plants not contacted with the foliar fertilizer compositions.

In embodiments of the invention, methods include contacting the foliage with one or more of the compositions as described above. By contacting is meant that an amount of the composition is placed onto the surface of the plant foliage. The composition may be contacted with foliage of the plants by any convenient protocol. In some embodiments, compositions are contacted by aerial application. Aerial application may include, but is not limited to spraying, dropping and otherwise applying the subject compositions by agricultural aircraft, gliders, helicopters, ultralights, biplanes, remote control airplanes, as well as motorized, mechanically or electrically powered sprayers or dusters supported by an elevated apparatus (e.g., towers, hydraulic lifts, cranes or support columns). In other embodiments, compositions may be contacted with the foliage of the plants on the ground using motorized, mechanically or electrically powered applicators, such as a tractor or other agricultural vehicle equipped with a sprayer or by hand-held sprayers and the like. Compositions may alternatively be manually applied (i.e., by hand).

The amount of the composition employed during any single application may vary depending on the condition of the plants, geographical area and environmental conditions (e.g., wind conditions, precipitation, etc.). Any amount may be applied so long as the amount is sufficient to enhance plant growth as desired. In some embodiments, the amount applied per acre may range from about 0.01 to 10 gallons per acre, such as 0.05 to 9 gallons per acre, such as 0.1 to 8 gallons per acre, such as 0.5 to 7 gallons per acre, such as 1 to 6 gallons per acre and including 2 to 5 gallons per acre. Depending on the type of condition of the type of plants, geographical area, environmental conditions, the subject compositions may be applied periodically (i.e., in predetermined time intervals). As such, the composition may be applied daily, weekly, every two weeks, monthly etc. In certain embodiments, the subject compositions are applied after each harvest. Alternatively, the subject compositions may be simply applied as needed, where fertilization is determined to be necessary or desired as by a trained agriculturalist Methods may include a single application of the subject compositions or may include multiple application intervals. By "multiple application intervals" is meant more than a single application of the composition, i.e., one or more subsequent application of the composition is performed after the first application. In practicing methods of the invention, protocols may include two or more application intervals, such as three or more application intervals, such as four or more application intervals and including five or more application intervals.

The duration between application intervals may vary depending on the number and size of the plants, geographical location, environmental conditions, the condition of the plants, etc. In certain instances, the duration between application intervals may be predetermined and follow at regular intervals. For example, the time between application intervals may be 1 hour or longer, such as 2 hours or longer, such as 5 hours or longer, such as 10 hours or longer, such as 12 hours or longer, such as 24 hours or longer, such as 48 hours or longer, such as 72 hours or longer, such as 96 hours or longer and including 168 hours or longer. Alternatively, the time between application intervals may be on demand, where one or more subsequent applications are performed based on need determined by a trained agriculturalist.

In certain embodiments, methods include determining that subject plants are in need of treatment with the foliar fertilizer composition. Determining that subject plants is in need of treatment with the foliar fertilizer composition may be performed by any convenient protocol, such as determined by a trained professional agriculturalist. In practicing methods of the present disclosure, determining whether subject plants are in need of treatment with the foliar fertilizer composition may include assessing the subject plants and evaluating by a human (either alone or with the assistance of a computer, if using a computer-automated program initially set up under human direction) whether the subject plants would benefit from treatment, such as for enhancing heat or cold stress tolerance.

In some instances, the subject plants may be determined to be in need of treatment with the foliar fertilizer composition where the plants has been subjected to increased heat or cold stress and has shown a 5% or greater decrease in crop production as compared to a suitable control (e.g., previous seasons production), such as a 10% or greater decrease in crop production, such as a 15% or greater decrease in crop production, such as a 20% or greater decrease in crop production and including a 25% or greater decrease in crop production due to changes in heat or cold stress as compared to a suitable control.

In other instances, the subject plants may be determined to be in need of treatment with the foliar fertilizer composition where the plants has been subjected to increased heat or cold stress and a crop production per area (e.g., pounds of fruits, nuts, vegetables, etc. per acre) which is below a predetermined threshold. For example, the subject plants may be determined to be in need of treatment where the crop production per area is 2% or greater below a predetermined threshold, such as 3% or greater below, such as 4% or greater below, such as 5% or greater below and including 10% or greater below a predetermined threshold.

In yet other instances, the subject plants may be determined to be in need of treatment with the foliar fertilizer composition by evaluating observable characteristics of the target plants subjected to increased heat or cold stress. Observable characteristics of target plants subjected to increased heat or cold stress may include, in some embodiments, uneven foliage shoots, necrotic foliage shoots, defoliage, stunted stem structure, stunted vine structure, chlorosis, stunted leaf structure and stunted fruit structure. In certain embodiments, the subject plants may be in need of treatment with the foliar fertilizer composition by determining that the increased heat or cold stress has caused physical damage to the subject plants.

Determining whether subject plants are in need of treatment may be performed at any time as desired. For example, determining whether subject plants are in need of treatment may be performed at predetermined intervals such as every day, every week, every two weeks, every month, etc. Alternatively, determining whether the subject plants is in need of treatment may be performed in conjunction with methods for applying the subject compositions as described above. For example, the subject plants may be monitored by human observation or electronic surveillance (e.g., video), between intervals during a multiple application interval and evaluated whether the subject plants are in need of subsequent application intervals. The subject plants may be evaluated for need of treatment 1 hour or later after applying the subject compositions, such as 2 hours or later, such as 3 hours or later, such as 5 hours or later, such as 10 hours or later, such as 12 hours or later, such as 24 hours or later, such as 48 hours or later and including 72 hours or later after applying the subject compositions.

Kits

Also provided are kits, where kits at least include one or more, e.g., a plurality of the subject compositions, as described above. In certain embodiments, the subject compositions in the kits may be provided in a package. For example, the compositions of the kits may be presented in individual pouches, bottles, or analogous containers, to preserve the compositions until use. For example, one form of suitable packaging is an air-tight container, air-tight bag, re-sealable water-tight/air-tight container, water-impermeable plastics material (e.g., polyvinylchloride), etc.

In some embodiments, kits may include a separate amount of each component of the subject compositions (e.g., source of plant growth regulator, ionophore, coenzyme, carbon skeleton compound, complexing agent, preservative source of potassium, source of calcium, water, etc.) where the user can mix each component separately in proportions desired, prior to application. In these embodiments, kits may further include one or more containers for mixing the subject compositions as well as a measuring device for portioning out each component, as desired.

In certain instances, kits of interest include an amount of each component of the subject compositions (e.g., source of plant growth regulator, ionophore, coenzyme, carbon skeleton compound, complexing agent, preservative source of potassium, source of calcium, water, etc.) and instructions for mixing the components to produce the foliar fertilizer composition.

In certain embodiments, one or more components in the kits are dry. By "dry" is meant that the component (e.g., carbon skeleton energy compound, preservative, source of potassium, source of calcium) contains little to no water. Accordingly, in these embodiments the components in the kits that are dry include 1% w/w water or less, such as 0.5% w/w water or less, such as 0.25% w/w water or less, such as 0.1% w/w water or less, such as 0.05% w/w water or less, such as 0.01% w/w water or less and including 0.001% w/w water or less. For the dry components in the kits, a desiccant compound that absorbs atmospheric moisture during storage may be included. The desiccant may be any convenient hygroscopic compound which induces or sustains the moisture content during storage such that the water content remains 1% w/w water or less, such as 0.5% w/w water or less, such as 0.25% w/w water or less, such as 0.1% w/w water or less, such as 0.05% w/w water or less, such as 0.01% w/w water or less and including 0.001% w/w water or less. The desiccant may be contained in a separate package so that it does not contaminate the dry component in the kit, for example in a mesh bag, opened container, or air/water permeable polymeric or non-polymeric package. Desiccants of interest may include, but are not limited to silica gel, propylene glycol, ethylene glycol, butylene glycol, glycerol triacetate, vinyl alcohol, neoagarobiose, glycerol, sorbitol, xylitol, maltitol, polydextrose, quillaia, lactic acid, urea, glycerin, aloe vera gel, activated alumina, aerogel, benzophenone, bentonite clay, calcium chloride, calcium sulfate, cobalt(II) chloride, copper(II) sulfate, lithium chloride, lithium bromide, magnesium sulfate, magnesium perchlorate, molecular sieves, potassium carbonate, sodium, sodium chlorate, sodium chloride, sodium hydroxide, sodium sulfate, sucrose and phosphorus pentoxide, among other desiccants.

Kits may further include components for practicing the subject methods, such as devices for applying the compositions to the foliage of the plants (e.g., sprayers or applicators), cartridges having a loaded predetermined amount of the subject compositions, measuring cups or devices for portioning desired amounts for application.

In addition, kits may also include instructions for how to use the subject compositions, where the instructions may include information about to how to apply the compositions to the foliage of plants, application interval schedules, and record keeping devices for executing an application interval regimen. The instructions are recorded on a suitable recording medium. For example, the instructions may be printed on a substrate, such as paper or plastic, etc. As such, the instructions may be present in the kits as a package insert, in the labeling of the container of the kit or components thereof (i.e. associated with the packaging or subpackaging) etc. In other embodiments, the instructions are present as an electronic storage data file present on a suitable computer readable storage medium, e.g., portable flash drive, CD-ROM, diskette, etc. In yet other embodiments, the actual instructions are not present in the kit, but means for obtaining the instructions from a remote source, e.g. via the internet, are provided. An example of this embodiment is a kit that includes a web address where the instructions can be viewed and/or from which the instructions can be downloaded. As with the instructions, the protocol for obtaining the instructions may be recorded on a suitable substrate.

Utility

The aqueous compositions of the subject invention find use in a variety of different applications, where such applications include enhancing plant growth through increased photosynthetic activity, enhanced heat and cold stress tolerance as well as improved overall health and production by the plants.

The subject methods, i.e., application of the composition to the foliage of the plants, may result in an enhancement of growth of a plant where the treated plant attains a higher total mass than the untreated plant. The amount of enhancement will typically be at least about 5%, usually at least about 10% and more usually at least about 25%, where in many embodiments the amount of enhancement may be 50% or greater. In many embodiments, the amount of enhancement will be at least about 100%.

Embodiments of the invention may also result in enhancement of crop yield, e.g., by 5-fold or more, 10-fold or more, 15-fold or more, 20-fold or more, etc., where the amount of enhancement may be 25% or greater, e.g., 50% or greater.

A variety of different plants may be treated according to the subject methods, where such plants include both crop and ornamental plants, as described above.

The following experiments are offered by way of illustration and not by way of limitation.

EXPERIMENTAL

Example 1—Preparing a Foliar Legacy™ Fertilizer Composition

An aqueous solution having 1 ppm folic acid, 1 ppm pyridoxine, 7,000 ppm sucrose, 100 ppm fulvic acid, 100 ppm citric acid with 5% Sea weed extract, 5 ppm Valinomycin, 5 ppm 4-GABA, 5 lb Potassium nitrate and 5 lb Calcium nitrate was prepared as follows:

| Material | Source | Amount/100 gal |
|---|---|---|
| Folic Acid | Pteroylglutamic Acid | 5-15 PPM |
| Pyridoxine | Pyridoxine Hydrochloride | 5-15 PPM |
| Sucrose | Table Sugar | 7000 PPM |
| Fulvic Acid | 2% Fulvic Acid | 100 PPM |
| Citric Acid | Citric Acid Monohydrate | 100 PPM |
| Sea weed extract | *Ascophyllum nodosum* | 5-10% |
| Ionophores | 4-GABA and Valinomycin | 5 PPM each |
| Potassium | Potassium nitrate | 5 lb |
| Calcium | Calcium nitrate | 5 lb |

Rutger's tomato seedlings were sprayed with either tap water or the resultant Legacy™ fertilizer composition at different concentrations—10% Legacy™, 25% Legacy™ and 50% Legacy™. A total of 6 sprays were made at 14-day intervals beginning at the 4th leaf stage. The plants were then cut at the soil line and air dried for 72 hours. The results are provided in Table 1 below. Weights of plants are expressed in grams.

TABLE 1

Weight of plants, expressed in grams

| Treatment | Replications | | | | | Total | Mean |
| | 1 | 2 | 3 | 4 | 5 | | |
|---|---|---|---|---|---|---|---|
| Control | 48 | 52 | 49 | 55 | 57 | 261 | 52.2 a |
| 10% Legacy™ | 65 | 68 | 67 | 69 | 67 | 336 | 67.2 b |
| 25% Legacy™ | 72 | 75 | 78 | 79 | 79 | 383 | 76.6 c |
| 50% Legacy™ | 88 | 87 | 90 | 86 | 89 | 440 | 88.0 d |

Mean separation via Duncan's MRT @ 5%.

Example 2—Effect of Foliar Legacy™ Fertilizer Composition on Heat and Cold Stress Tolerance Rutger's tomato seedlings were sprayed with either tap water or 50% Legacy™. A total of 6 sprays were made at 14-day intervals beginning at the 4th leaf stage. One set of 5 plants per treatment were moved to a growth chamber, where the temperature was increased up to ~105° F. Another set of 5 plants per treatment were moved to a walk-in freezer, where the temperature was maintained at ~28° F. The rest of the plants were left in the greenhouse with no change. Observations include—

1. The plants were cut at the soil line and air dried for 72 hours. The results are provided in Table 2 below. Weights of plants are expressed in grams.

2. To show the effect of auxin with cytokinin on stimulating cell division, total number of branches were counted. The results are provided in Table 3 below.

3. To show the effect of auxin with gibberillin on cell elongation, length of shoot was measured. The results are provided in Table 4 below. Length of shoot is expressed in cm.

TABLE 2

Weight of plants, expressed in grams

| Treatment | Replications | | | | | Total | Mean |
|---|---|---|---|---|---|---|---|
| | 1 | 2 | 3 | 4 | 5 | | |
| Control | 32 | 28 | 29 | 33 | 31 | 153 | 30.6 a |
| 50% Legacy ™ | 47 | 46 | 48 | 49 | 45 | 235 | 47.0 b |
| Control at ~28° F. | 34 | 33 | 36 | 34 | 33 | 170 | 34.0 c |
| 50% Legacy ™ at ~28° F. | 49 | 48 | 46 | 51 | 55 | 249 | 49.8 d |
| Control at ~105° F. | 28 | 29 | 26 | 29 | 27 | 139 | 27.8 e |
| 50% Legacy ™ at ~105° F. | 48 | 46 | 49 | 51 | 52 | 246 | 49.2 f |

Mean separation via Duncan's MRT @ 5%.

TABLE 3

Number of branches per plant

| Treatment | Replications | | | | | Total | Mean |
|---|---|---|---|---|---|---|---|
| | 1 | 2 | 3 | 4 | 5 | | |
| Control | 19 | 22 | 25 | 27 | 29 | 122 | 24.4 a |
| 50% Legacy ™ | 39 | 37 | 38 | 36 | 38 | 188 | 37.6 b |
| Control at ~28° F. | 26 | 28 | 25 | 26 | 27 | 132 | 26.4 c |
| 50% Legacy ™ at ~28° F. | 43 | 47 | 46 | 49 | 46 | 231 | 46.2 d |
| Control at ~105° F. | 27 | 28 | 28 | 27 | 26 | 136 | 27.2 e |
| 50% Legacy ™ at ~105° F. | 58 | 59 | 57 | 58 | 59 | 291 | 58.2 f |

Mean separation via Duncan's MRT @ 5%.

TABLE 4

Length of shoot, measured in cm

| Treatment | Replications | | | | | Total | Mean |
|---|---|---|---|---|---|---|---|
| | 1 | 2 | 3 | 4 | 5 | | |
| Control | 17 | 19 | 15 | 17 | 16 | 84 | 16.8 a |
| 50% Legacy ™ | 34 | 32 | 34 | 35 | 36 | 171 | 34.2 b |
| Control at ~28° F. | 10 | 12 | 10 | 11 | 10 | 53 | 10.6 c |
| 50% Legacy ™ at ~28° F. | 35 | 34 | 35 | 37 | 33 | 174 | 34.8 d |
| Control at ~105° F. | 13 | 13 | 14 | 12 | 13 | 65 | 14.0 e |
| 50% Legacy ™ at ~105° F. | 44 | 42 | 47 | 46 | 49 | 228 | 45.6 f |

Mean separation via Duncan's MRT @ 5%.

Example 3—Comparison of Foliar Legacy™ Fertilizer Composition and a Control Foliar Fertilizer Rutger's tomato seedlings were sprayed with either: 1) tap water; 2) fertilizer composition as described herein and 3) a control fertilizer composition the includes folic acid, pyridoxine, sucrose, fulvic acid and citric acid (as prepared according to U.S. Pat. No. 6,475,258 $B_1$, the disclosure of which is herein incorporated by reference) at 14-day intervals for 2 months beginning at the 4th leaf stage. 4 sprays were applied over the 2-month period. The plants were then cut at the soil line and air dried for 72 hours. The results are provided in Table 5 below. Weights of plants are expressed in grams.

TABLE 5

| Treatment | Replications | | | | | Total | Mean |
|---|---|---|---|---|---|---|---|
| | 1 | 2 | 3 | 4 | 5 | | |
| Tap Water | 49 | 50 | 48 | 52 | 55 | 254 | 50.8a |
| Control Composition | 66 | 69 | 68 | 67 | 66 | 336 | 67.2b |
| Legacy ™ | 89 | 87 | 91 | 88 | 89 | 444 | 88.8c |

Mean separation via Duncan's MRT @ 5%.

As shown in Table 5, plants contacted with the subject compositions which include a source of a plant growth regulator and an ionophore exhibited increased growth as compared to both tap water and the control foliar fertilizer composition.

Example 4—Enhancement of Crop Growth by Foliar Legacy™ Fertilizer Composition

The foliar Legacy™ fertilizer composition was applied to various crops such as Almonds, Citrus, Peppers, Grapes, Bent grass, Russet potatoes, Peaches, Tomatoes, Blueberries etc. As shown below, the foliar Legacy™ fertilizer composition enhanced tolerance of plant to excessive heat and cold.
Cold Resistance in Almonds:
  In one test, for proving enhancement of cold resistance, 800 acres of almond crops were sprayed, which were just near the tip hardening, pit hardening stage with foliar Legacy™ fertilizer composition and saved substantial amount of crop as compared to neighboring crops which experienced more than 80% loss of crop due to cold stress.
Cold Tolerance in Lemon Trees:
  In a second test, enhancement of cold tolerance for lemon trees was demonstrated. A block of lemon trees was applied with foliar Legacy™ fertilizer composition. All the lemon trees that were left untreated in 3 rows were covered with fronds of palm trees top to protect from freezing. Treated trees include rows of tangerine oranges using foliar Legacy™ fertilizer composition and some additional Zinc. Frost was observed to only exhibit detrimental effects in untreated trees.
Cold Tolerance in Peppers:
  In a third test, enhancement of cold tolerance in peppers in Coachella Valley, Calif. was studied, where the temperature shifts dramatically. Pepper seedlings were sprayed with foliar Legacy™ fertilizer composition. A comparison of the pepper crops from those not treated exhibited a significant loss of crop whereas the pepper crops treated with the foliar Legacy™ fertilizer composition exhibited little to no loss due to cold freeze. Marketable beautiful peppers were harvested at 2500 boxes per acre and were sold at $50 per box, where the normal price was $7.50, totaling gross $125,000 per acre. With a 100 acre green pepper crop field $12.5 million of peppers were saved with the foliar Legacy™ fertilizer composition.
Cold Tolerance in Table Grapes and Wine Grapes:
  In a fourth test, table grape and wine grapes were treated with foliar Legacy™ fertilizer composition ahead of frost. Both the table grapes and wine grapes were unaffected by the frost and high quality wine was produced from the treated grapes.
Heat Tolerance in Turf Grass
  In a first heat tolerance test, turf grass was treated with foliar Legacy™ fertilizer composition. Bent grass in Coachella valley, CA, where in certain days temperature will reach up to 135° F. in summer and in winter it will drop to 25° F. was treated. The foliar Legacy™ fertilizer composition was sprayed onto the grass. Photographs of grass grown under 135° F. summers showed healthy grass similar to those grown in milder climates such as at the San Francisco golf and country club.

Heat Tolerance in Grass of a Golf Course

In a second heat tolerance test, 5 days after a heat event that turned the grass yellow overnight. Herbicide called Norflurzon (i.e., solican) was the cause and bent grass going down to about 1½ ft. in the soil is contacting this chemical. Three sprays of foliar Legacy™ fertilizer composition at a rate of 2.4 gallons per 100 gallons was conducted over all the sod. In addition, the grass site was prepared with old grass removed, scratched with a rake, and treated with fertilizer material containing CN-9, Potassium nitrate, Keel™ and Fusion Soil™. The grass exhibited strong heat tolerance and remain healthy through the duration of the event.

Heat Tolerance in Russet Potatoes:

In a third heat tolerance test, Russet potatoes were treated with foliar Legacy™ fertilizer composition. Excessive heat affects Russet potatoes where the spuds become affected by hollow core. Hollowed core potatoes stopped growing. The foliar Legacy™ fertilizer composition was sprayed on plants and exhibited enhanced heat stress tolerance. The potato crop also withstood the infections of *Verticillium* sp., other rotting fungal pathogens such as early blight caused by *Alternaria* sp. and other related species.

Heat Tolerance in Peaches

In a fourth heat tolerance test, peach trees were treated with foliar Legacy™ fertilizer composition because excessive heat causes wilting and the fruit will have reduced shelf life. The peach variety tested was Regular Liberta. This variety is often aborts fruiting prematurely and hosting poor shelf life. Treatment with foliar Legacy™ fertilizer composition resulted in peaches produced by treated trees in firm condition and they did not have usual drop or abortion. The peaches also exhibited sustained superior shelf life.

Heat Tolerance in Young Tomato Transplants

In a fifth heat tolerance test, young tomato transplants were treated with foliar Legacy™ fertilizer composition at Five points, CA. High temperatures hit just after transplantation. Treatment with 10 gal/acre of soil amendment with 1 gal of microbe mix and along with foliar Legacy™ fertilizer composition. Calcium was supplemented. The treated tomatoes not only survived the heat stress, but produced 85 tons of tomatoes/acre.

Heat Tolerance in Blueberries

In a sixth heat tolerance test, blueberries in Willamette valley, Oregon were treated with foliar Legacy™ fertilizer composition. Blueberries were subjected to high temperatures, up to 95° F. and the rows of blueberries treated with foliar Legacy™ fertilizer composition went on to produce the greatest yield of blueberries. Other growers which did not apply the foliar Legacy™ fertilizer composition to the blueberry crops were not able to market their fruit because the heat damaged the crop and the affected berries aged rapidly on the vine.

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A composition comprising:
   a first source comprising a plant growth regulator;
   a second source comprising an ionophore;
   a third source comprising a coenzyme;
   a fourth source comprising a carbon skeleton energy compound;
   a fifth source comprising potassium;
   a sixth source comprising calcium; and
   water.

2. The composition according to claim 1, wherein the source of the plant growth regulator comprises a cytokinin, an auxin, a gibberellin, a jasmonate, a salicylic acid, a strigolactone, an abscisic acid, a brassinosteriod or a combination thereof.

3. The composition according to claim 1, wherein the source of the plant growth regulator is a seaweed extract.

4. The composition according to claim 3, wherein the seaweed extract is from a seaweed selected from the group consisting of Durvillea, Ascophyllum, *Ecklonia, Fucus, Laminaria*, Sargassum, Tubinaria and a combination thereof.

5. The composition according to claim 1, wherein the source of plant growth regulator is present in an amount of from 2% w/w to 20% w/w.

6. The composition according to claim 1, wherein the ionophore is an antibiotic, an amino butyric acid or a combination thereof.

7. The composition according to claim 1, wherein the ionophore is present in said composition in an amount ranging from 1 ppm to 500 ppm.

8. The composition according to claim 1, wherein the coenzyme is a vitamin B complex.

9. The composition according to claim 1, wherein the coenzyme is present in the composition in an amount of from 1 ppm to 50 ppm.

10. The composition according to claim 1, wherein the carbon skeleton energy compound is a source of carbohydrate.

11. The composition according to claim 10, wherein the source of carbohydrate comprises a monosaccharide, disaccharide or combination thereof.

12. The composition according to claim 1, wherein the carbon skeleton energy compound is present in an amount ranging from 50 ppm to 15000 ppm.

13. The composition according to claim 1, further comprising a complexing agent.

14. The composition according to claim 1, wherein the composition comprises:
   a first source of a plant growth regulator comprising a seaweed extract;
   a second source of an ionophore comprising gamma amino butyric acid (GABA) and valinomycin;
   a third source of a coenzyme comprising folic acid and pyridoxine;
   a fourth source of complexing agent comprising fulvic acid and citric acid;
   a fifth source of a carbon skeleton energy compound comprising sucrose;
   a sixth source comprising potassium nitrate;
   a seventh source comprising calcium nitrate; and
   water.

15. A method comprising contacting a composition to foliage of a plant, wherein the composition comprises:
   a first source comprising a plant growth regulator,
   a second source comprising an ionophore;
   a third source comprising a coenzyme;
   a fourth source comprising a carbon skeleton energy compound;
   a fifth source comprising potassium;
   a sixth source comprising calcium; and
   water.

16. The method according to claim 15, wherein contacting comprises applying the composition from an applicator operated on the ground.

17. The method according to claim 15, wherein the composition is applied using a hand-held applicator.

18. The method according to claim 15, wherein contacting comprises applying the composition from an aerial applicator.

19. The method according to claim 18, wherein the aerial applicator is selected from the group consisting of agricultural aircraft, gliders, helicopters, ultra-lights, biplanes, remote control airplanes and mechanically or electrically powered distributors or distributors supported by an elevated apparatus.

\* \* \* \* \*